Oct. 6, 1964 E. F. FOX 3,152,274
BRUSH HOLDER ADAPTER
Filed March 16, 1962

INVENTOR.
Edwin F. Fox,
BY Parker & Carter
Attorneys.

United States Patent Office 3,152,274
Patented Oct. 6, 1964

3,152,274
BRUSH HOLDER ADAPTER
Edwin F. Fox, Oak Park, Ill., assignor to Clements Mfg. Co., Chicago, Ill., a corporation of Illinois
Filed Mar. 16, 1962, Ser. No. 180,146
2 Claims. (Cl. 310—247)

This invention relates to electric motors and the like and has particular relation to the provision of an adapter effective to permit the employment of brushes of increased length in electric motors and the like which are currently in operational use in the field.

In electric motors and the like wherein brushes are held within brush holders for contact with an armature, as further described hereinbelow, the brushes are held against rotation within said holders and an end face of each brush is held against a rotating armature. In time, the end face of the brush wears and a yielding means urges the brush continuously toward the armature as the brush wears. In certain installations in the field the resulting brush life has been found of insufficient duration, requiring frequent replacement of brushes. The expedient of employing a longer, and therefore greater-lived, brush cannot be employed in existing motors and the like in the field without a prohibitively expensive and uneconomical modification of the motor housing, brush holder, etc. Similarly, the removal of the present brush holders from motors installed and operating in the field and replacement with a lengthened brush holder containing a lengthened brush would be equally uneconomical. Accordingly, it is one purpose of the present invention to provide a simple and inexpensive means effective to provide increased brush life in existing electric motors and the like without substantial interruption in the operational use of such motors and the like.

Another purpose of the invention is to provide an adapter for existing brush holders which shall be effective to provide for the reception and retention of a brush of increased length in the combination of the adapter and holder.

The brushes with which the present invention is concerned are generally rectilinear in cross section and are slidably received within a brush holder having a similarly designed rectilinear channel within which the brush is slidably mounted. Alignment of the brush with the reception channel is therefore a requirement. It is, accordingly, one purpose of the invention to provide a brush holder adapter which shall be free of any problem of misalignment.

Another purpose is to provide a brush holder adapter which shall make maximum use of all present existing parts.

Another purpose is to provide an adapter, the use of which permits the insertion of a brush in a brush holder without concern for the alignment of channels within the adapter and the holder.

Another purpose is to provide an adapter and brush holder combination wherein both the adapter and the brush holder are provided with rectilinear channels, the design of said adapter being such as to permit the combined use of said adapter and said holder without concern for the alignment of said channels.

Other purposes will appear from time to time during the course during the specification and claims.

I illustrate my invention more or less diagrammatically in the accompanying drawings, wherein.

Like parts are indicated by like numerals throughout the specification and drawings.

Figure 1:
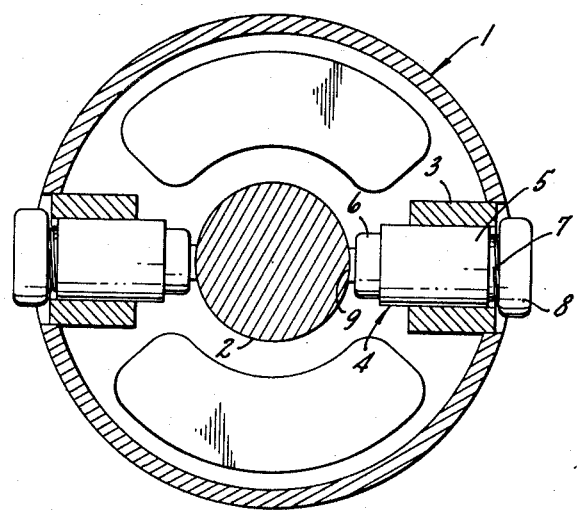
FIGURE 1 is an end view in partial cross-section illustrating part of a motor and a brush holder and brush of conventional use.
Figure 6:
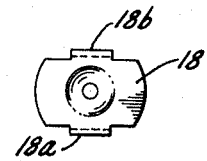
FIGURE 6 is a detail view illustrating part of the assembly illustrated in FIGURE 5.
Figure 5:
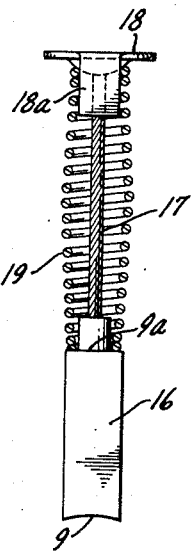
FIGURE 5 is a side elevation illustrating a brush assembly.

Referring to the drawings, and particularly to FIGURE 1, the numeral 1 illustrates generally a housing which may, for example, be a motor housing. Extending axially within and rotatable within the housing 1 is an armature 2. A socket 3 extending radially through the wall of housing 1 receives, as by press fit, a brush holder indicated generally by the numeral 4. The brush holder 4 has an outer circumferential wall or shield 5 formed of insulating material and a central brush-holding cylindrical portion 6. The portion 6 extends inwardly of the housing 1 a distance beyond the portion 5 and has at its opposite end, and extending outwardly from housing 1, an outwardly threaded circumferential end portion 7 with which a cover or cap 8 may be threadably engaged. A brush end face 9 extends inwardly from the holder portion 6 for contact with the circumferential outer surface of the armature 2.

Figure 7:
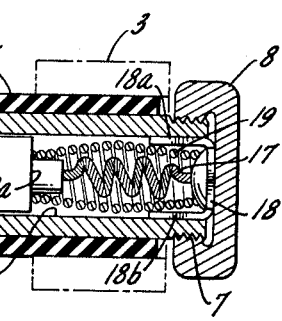
FIGURE 7 is a side view in partial cross-section, of a conventional brush and holder assembly.

Referring now to FIGURE 7, it will be observed that a passage or channel 15 extends longitudinally throughout the length of the brush holder 4. The channel 15 is rectilinear in cross-section and may, for convenience, be rectangular. The brush 16 has the same cross-sectional configuration and is just slidably received within the channel 15. Opposite the end face 9 of brush 16 an energy-conductive cable 17 is secured to the brush 16 and extends to and is in energy-transmitting contact with the contact element 18. A coil spring 19 surrounds the conductor 17 and has its opposite ends in engagement with the end face 9a of brush 16 and the inner surface of element 18. The element 18 has a major dimension longer than the major dimension of the channel 15 and therefore has a pair of its opposite longitudinal ends in overlying contact with the outer end face of holder portion 7. To insure absolute contact, however, with holder portion 7, the element 18 has a pair of ears or tabs 18a, 18b dependent therefrom and in contact with a pair of opposite inner surfaces within that portion of channel 15 which extends through end portion 7.

Figure 3:
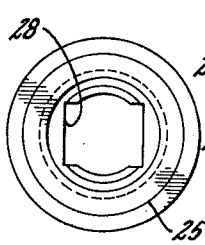
FIGURE 3 is an end view of the structure of FIGURE 2.
Figure 2:
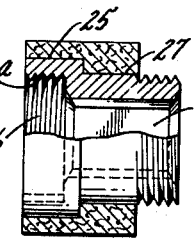
FIGURE 2 is a side elevational partial cross-section illustrating the adapter of the invention.
Figure 4:
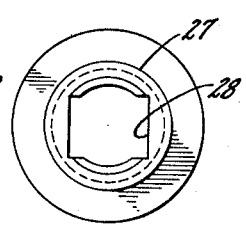
FIGURE 4 is an opposite end view of the structure of FIGURE 2.

Referring now to FIGURE 2, I provide an adapter having a major circumferential outer surface 25 within which a circular passage 26 is formed. Threads 26a are formed within the circular passage 26. Extending from the opposite end of passage 26 is a second, and reduced, circumferential outer surface 27 which is threaded. As best seen in FIGURES 3 and 4, a substantially rectilinear passage 28 is formed in the portion 27 and communicates directly with and in axial alignment with the circular passage 26.

Figure 8:
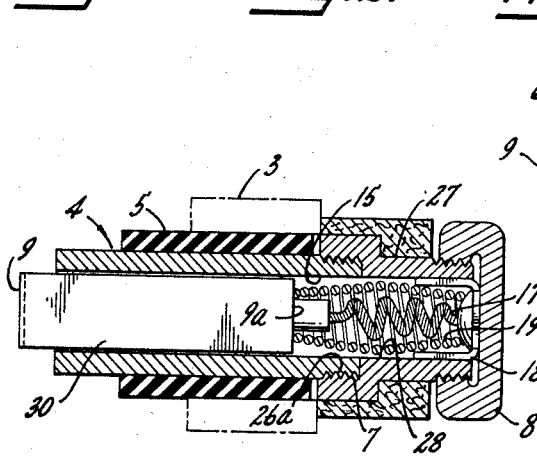
FIGURE 8 is a side view, in partial cross-section of a brush holder and adapter combination of the invention.

The use and operation of the invention are as follows:

The use in combination of the brush holder and adapter of the invention is illustrated in FIGURE 8. A brush 30 of substantially increased length over that of brush 16 is pushed past through the rectilinear channel 28 of the adapter. It will be understood that the channel 28 in the adapter is identical in cross-section with the channel 15 in the brush holder. With the brush 30 having been passed entirely through the passage 28 and portion 27 of the holder, the connector 17, element 18 and spring 19 extend through the passage 28, with the element 18 remaining out of engagement with the channel 28.

The adapter and the lengthened brush 30 are then moved toward the holder 4. The brush 30 is aligned with the channel 15 in the holder 4 and is slidably moved into the channel 15 and into a position similar to that illustrated in FIGURE 8. The adapter is then threaded into engagement with the holder 4, the threads 26a engaging the threads on the outer surface of holder portion 7. Thereafter, the element 18 is pressed into seating engagement and contact with the metal portion 27 of the adapter, the spring 19 being suitably compressed thereby, it being understood that the length of flexible connector 17 and the tension of spring 19 have been predetermined for appropriate engagement of brush end face 9 with armature 2. The cap 8 is then threaded upon adapter portion 27, the outer threads thereof being identical to those on holder portion 7.

I have found that an increase in the useful life of brush 30 over that of brush 16 is as much as 33⅓%.

The channel 28 in adapter portion 27 and the channel 15 in holder 4 are spaced apart by a channel portion 26 in the adapter which is circumferential and of greater diameter than the major dimension of channel 28 or 15. Thus, the inner end face 9a of brush 30 with which connector 17 and spring 19 are engaged may, during assembly or usage, move into this circumferential channel portion. Since the connector 17 and spring 19 are, of course, flexible, and since the brush 30 is never required to slidably engage both the channels 28 and 15, it will be noted that alignment of channels 28 and 15 is unnecessary and misalignment thereof is productive of no injury or difficulty in assembly or usage.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

1. In combination, a brush holder, a channel extending longitudinally through said brush holder in axial alignment therewith, said channel being generally rectilinear in cross section, an outwardly threaded circumferential end portion on said holder surrounding one end of said channel, an adapter threadably engaged with said outwardly threaded circumferential end portion and extending in axial alignment with said holder from said outwardly threaded circumferential portion, said adapter having a circumferential channel portion in axial alignment with said holder channel and communicating with the end of said holder channel surrounded by said outwardly threaded circumferential holder portion, said adapter having a rectilinear channel communicating with said circumferential channel in axial alignment therewith, said rectilinear adapter channel having a cross-sectional configuration identical to that of the channel in said holder, said adapter having an outwardly threaded circumferential end portion surrounding said rectilinear channel in said adapter and having an outer diameter identical with that of said outwardly threaded circumferential end portion on said holder.

2. In combination, a brush holder, a channel extending longitudinally through said brush holder in axial alignment therewith, said channel being generally rectilinear in cross section, an outwardly threaded circumferential end portion of said holder surrounding one end of said channel, an adapter threadably engaged with said outwardly threaded circumferential end portion and extending in axial alignment with said holder from said outwardly threaded circumferential portion, said adapter having a circumferential channel portion in axial alignment with said holder channel and communicating with the end of said holder channel surrounded by said outwardly threaded circumferential holder portion, said adapter having a rectilinear channel communicating with said circumferential channel in axial alignment therewith, said rectilinear adapter channel having a cross-sectional configuration identical to that of the rectilinear channel in said holder, said adapter having an outwardly threaded circumferential end portion surrounding said rectilinear channel in said adapter and having an outer diameter identical with that of said outwardly threaded circumferential end portion on said holder, a brush slidably received within said holder channel, said brush having one of its ends within said circumferential channel portion in said adapter and its opposite end extending outwardly beyond the opposite end of said holder, a contact element engaging the walls of said adapter rectilinear channel, a flexible connector connecting said brush and said element and a spring surrounding said connector and having its opposite ends in engagement with said element and said brush end within said circumferential adapter portion.

References Cited in the file of this patent

UNITED STATES PATENTS 2,264,998  Miner _____ Dec. 2, 1941

FOREIGN PATENTS 657,791  Germany _____ Mar. 12, 1938